(12) United States Patent
Konvicný et al.

(10) Patent No.: US 12,709,067 B2
(45) Date of Patent: Aug. 18, 2026

(54) INFILL STRUCTURE WITH INCREASED Z-STRENGTH

(71) Applicant: Ultimaker B.V., Utrecht (NL)

(72) Inventors: Jirí Konvicný, Utrecht (NL); Sarita Sharma, Utrecht (NL)

(73) Assignee: Ultimaker B.V., Zaltbommel (NL)

( * ) Notice: Subject to any disclaimer, the term of this patent is extended or adjusted under 35 U.S.C. 154(b) by 340 days.

(21) Appl. No.: 18/256,640

(22) PCT Filed: Dec. 14, 2021

(86) PCT No.: PCT/NL2021/050762
§ 371 (c)(1),
(2) Date: Jun. 9, 2023

(87) PCT Pub. No.: WO2022/131911
PCT Pub. Date: Jun. 23, 2022

(65) Prior Publication Data

US 2024/0092029 A1 Mar. 21, 2024

(30) Foreign Application Priority Data

Dec. 17, 2020 (NL) .................................... 2027138

(51) Int. Cl.
*B29C 64/393* (2017.01)
*B29C 64/118* (2017.01)
*B33Y 10/00* (2015.01)
*B33Y 50/02* (2015.01)

(52) U.S. Cl.
CPC .......... *B29C 64/393* (2017.08); *B29C 64/118* (2017.08); *B33Y 10/00* (2014.12); *B33Y 50/02* (2014.12)

(58) Field of Classification Search
CPC .................................................. B29C 64/393
See application file for complete search history.

(56) References Cited

U.S. PATENT DOCUMENTS

| | | | | |
|---|---|---|---|---|
| 9,884,450 | B2 * | 2/2018 | Schmehl | B33Y 40/00 |
| 10,005,126 | B2 | 6/2018 | Page | |
| 2010/0215856 | A1 * | 8/2010 | Kritchman | B33Y 10/00 427/277 |

(Continued)

FOREIGN PATENT DOCUMENTS

| | | | | |
|---|---|---|---|---|
| CN | 106794624 A | * 5/2017 | | B33Y 10/00 |
| EP | 3109035 A1 | * 12/2016 | | B33Y 10/00 |

*Primary Examiner* — Suresh Suryawanshi
(74) *Attorney, Agent, or Firm* — Ipsilon USA—NLO

(57) ABSTRACT

A method of creating instructions for an FFF printer for printing an infill structure of a 3D object is described. Instructions are created for printing a first layer (1) comprising a number of substantially parallel traces (11) that are separated by intermediate elongated first voids (12) with a first predefined width, and for printing a second layer (2) with traces (21) running substantially in parallel to the traces of the first layer, but with a first offset to the traces of the first layer, such that the traces of the second layer are arranged above the elongated first voids in the first layer, and for printing a third layer (3) with traces (31) running substantially in parallel to the traces of the second layer, but with a second offset to the traces of the second layer, wherein the traces in the third layer are separated by intermediate elongated third voids.

14 Claims, 11 Drawing Sheets

(56) References Cited

U.S. PATENT DOCUMENTS

| | | | | |
|---|---|---|---|---|
| 2017/0225445 | A1* | 8/2017 | Gardiner | B29C 64/106 |
| 2019/0283329 | A1* | 9/2019 | Lensgraf | B29C 64/40 |
| 2020/0101531 | A1* | 4/2020 | Prakash | B22F 7/08 |
| 2024/0326323 | A1* | 10/2024 | Bouma | B29C 64/393 |

* cited by examiner 105
16,00
14,00
12,00
10,00
8,00
6,00
4,00
2,00
0,00
MPa
107
106
1
2
3
4
5
6
7
8
9
10
11
12
Bars
Stress at break [MPa]
Average Stress at break:
Maximum Stress at break:
Minimum Stress at break:

INFILL STRUCTURE WITH INCREASED Z-STRENGTH

FIELD OF THE INVENTION

The invention relates to a Fused Filament Fabrication method. The invention also relates to a method of creating instructions for an FFF printer for printing an infill structure of a 3D object, and to a computing device to perform the method of creating instructions for an FFF printer. The invention also relates to a computer program product.

BACKGROUND ART

Fused filament fabrication (FFF) is a 3D printing process that uses a continuous filament of a thermoplastic material. Filament is fed from a filament supply through a moving, heated print head, and is deposited through a print nozzle onto an upper surface of a build plate. The print head may be moved relative to the build plate under computer control to define a printed shape. In certain FFF devices, the print head moves in two dimensions to deposit one horizontal plane, or layer, at a time. The work or the print head is then moved vertically by a small amount to begin a new layer. In this way a 3D printed object can be produced made out of a thermoplastic material.

A well-known challenge in FFF is how to manufacture sufficiently strong parts. Due to the way of depositing layers on top of each other, the strength in the Z direction (i.e. the direction perpendicular to the build surface) is often lower than in the other directions. In order to increase the Z-strength of 3D printed objects, different kinds of techniques were proposed including the post-processing of part using ovens, or building a 3D part in a sufficiently heated build chamber. Also, additional curing steps using e.g. radiation was suggested. All these techniques increase the layer bondage between the subsequent layers of a 3D part, and as such increase the total strength in the Z-direction.

A disadvantage of the solutions mentioned above is that additional heat and/or additional processing steps are required which will increase processing time and increase energy consumption.

SUMMARY OF THE INVENTION

The aim of the present invention is to provide a method of creating instructions for an FFF printer for printing an infill structure of a 3D object, wherein the Z-strength of the object is increased without the need for additional processing steps.

According to a first aspect of the present invention, there is provided a method of creating instructions for an FFF printer for printing an infill structure of a 3D object, the method comprising:

- creating first instructions for printing a first layer comprising a number of substantially parallel traces that are separated by intermediate elongated first voids with a first predefined width;
- creating second instructions for printing a second layer with traces running substantially in parallel to the traces of the first layer, but with a first offset to the traces of the first layer, such that the traces of the second layer are arranged above the elongated first voids in the first layer;
- creating third instructions for printing a third layer with traces running substantially in parallel to the traces of the second layer, but with a second offset to the traces of the second layer, wherein the traces in the third layer are separated by intermediate elongated third voids.

It is noted that the so-called ‘first layer’ mentioned above does not need to be the one that is deposited directly on the build surface. Below the first layer other layers could have been deposited/designed earlier. In practice, the ‘first layer’ can actually be e.g. the second or the tenth layer of a print.

According to the invention, the first layer comprises voids that will be filled during the deposition of the second layer. The voids in the first layer are appropriately dimensioned so that, when using sufficient print material, the elongated first voids in the first layer are filled and a second layer is formed. Preferably, the second layer gets into contact with a layer beneath the first layer. So, the second layer bonds with the first layer and also with the layer beneath the first layer, also referred to a layer zero. If the process of creating the first, second and third layer continuous, a 3D object can be created that has an increased Z-strength. Tests have shown that the Z-strength is increased as compared to object that are designed and manufactured using regular layers wherein each layer only contacts the one directly below. By creating traces that run in parallel to the traces of the first layer, the contact with layer zero is present along the whole length of the traces. It is noted that in order to get the desired strength increase, the traces do not need to be exactly parallel, although this is preferred. It may be possible to create substantially parallel traces that actually have a small angle, which may be as small as 5 degrees or less. It should be clear that the longer the traces of the infill the smaller the preferred angle in order to get the wanted filling of the voids.

In an embodiment, the first predefined width v1 of the first voids is dimensioned so that when depositing the second layer, a first amount of the print material of the second layer enters the first voids in the first layer, and a second amount of the print material of the second layer lies on top of the first layer.

In an embodiment, the predefined width v1 of the first voids is dimensioned so that $0.1*w1<v1<=1.0*w1$, with w1 a predefined width of the traces in the first layer. In a specific embodiment the predefined width v1 of the first voids is dimensioned so that $0.4*w1<v1<=1.0*w1$. It is noted that the width v1 may depend on the material properties and/or on the printing temperatures used.

In an embodiment, the traces of the second layer are created using more material per area unit as compared to the traces of the first layer. By using more material for the second layer the voids can be filled and the traces of second layer can have the same height and width of the first layer.

In an embodiment, the traces of the second layer, after deposition, are in contact with a layer below the first layer. By contacting the layer below the first layer, a bonding will occur between that layer and the second layer, which will increase the Z-strength.

In an embodiment, the traces in the second layer are separated by intermediate elongated second voids with a second predefined width v2. In this way, the third layer can have the same cross sections as the second layer, and a repetitive structure can be manufactured.

In an embodiment, the second predefined width v2 of the second voids is dimensioned so that when depositing the third layer, a first amount of the print material of the third layer enters the second voids in the second layer, and a second amount of the print material of the third layer lies on top of the second layer.

In an embodiment, a predefined width of the traces in the second layer is such that after deposition, the traces in the second layer touch neighbouring traces. This may will help to reduce the gaps/voids in between the parallel traces.

In an embodiment, the first and second offset are selected so that the traces of the third layer are arranged above the traces of the first layer. This design strategy will create a particular shape within the infill lines, with a repetitive structure that gave good results during strain tests.

According to a further aspect, there is provided a computing device comprising one or more processing units, the one or more processing units being arranged to perform the method as described above.

According to yet a further aspect, there is provided a computer program product comprising code embodied on computer-readable storage and configured so as when run on one or more processing units to perform the method as described above. The computer program product may be a slicing program for creating the instructions for an FFF printer, such as G-code instructions. The instructions may comprise instructions for the nozzle of the printer to move from one position to the next while depositing material. The path followed by the nozzle is referred to as the toolpath. The instructions may also comprise information on the speed of the nozzle, the temperature of the nozzle, and other information as will be known to the skilled reader.

The slicing program may be arranged to create instructions for the FFF printer so that the different layers of the infill structure can be created to produce an increased strength of the object once printed.

According to yet a further aspect, there is provided a Fused Filament Fabrication method comprising:

- depositing a first layer comprising a number of substantially parallel traces that are separated by intermediate elongated first voids with a first predefined width v1;
- depositing a second layer with traces running substantially in parallel to the traces of the first layer, but with a first offset to the traces of the first layer, such that the traces of the second layer are arranged above the elongated first voids in the first layer;
- depositing a third layer with traces running substantially in parallel to the traces of the second layer, but with a second offset to the traces of the second layer, wherein the traces in the third layer are separated by intermediate elongated third voids.

Optionally, the first and third layer are deposited using a first material, and the second layer is deposited using a second material different from the first material. Preferably, the materials are chosen so that they bond well together, wherein for example one material is more viscous to better fill all the voids whereas the other may have better strength properties.

The first predefined width v1 of the first voids may be dimensioned so that when depositing the second layer, a first amount of the print material of the second layer enters the first voids in the first layer, and a second amount of the print material of the second layer lies on top of the first layer.

BRIEF DESCRIPTION OF THE DRAWINGS

These and other aspects of the invention are apparent from and will be elucidated with reference to the embodiments described hereinafter. In the drawings, FIG. 1A schematically shows a cross-section of a first infill layer printed on a support;

FIG. 8 shows a flow chart of a method of creating instructions for an FFF printer for printing an infill structure of a 3D object, according to an embodiment of the invention;

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1A:
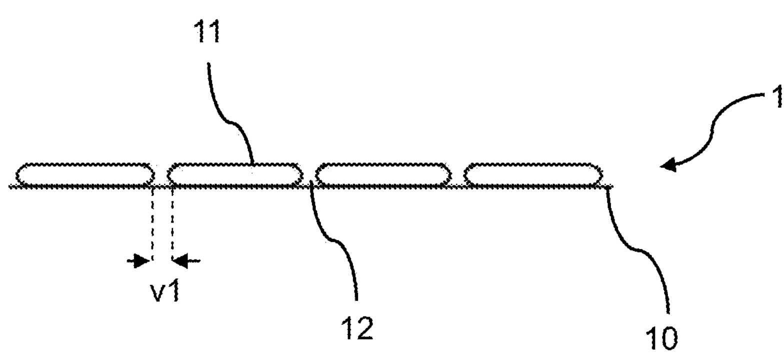
FIG. 1B schematically shows a cross-section of the first infill layer with a second layer printed on top of the first layer.
FIG. 1C schematically shows a cross-section of the first infill layer and the second layer with a third layer printed on top of the second layer.

FIG. 1A schematically shows a cross-section of a first infill layer 1 printed on a support 10, which may be a surface of a build plate, or a surface of a previous layer, such as a top layer of a printed raft or a top layer of a bottom wall of the object to be printed. Alternatively, the first infill layer 1 may be printed on top of an object made by other manufacturing technology.

The first layer 1 may be designed using a slicing program, and then printed using an FFF printer that is arranged to process G-code (or other types of printer instructions) produced by the slicing program, as will be explained below in more detail. This also accounts for the other layers described below. As shown in FIG. 1A, the first layer 1 comprises a number of traces (also referred to as tracks or extrusion lines) 11 that run in parallel and are separated by voids 12 having a predefined width v1. It is noted that the printing direction in FIG. 1A is perpendicular to the plane of view. It is further noted that the traces may have a small angle in which case the traces are not exactly parallel. Below, we use the words substantially parallel to indicate that the traces in one layer may have a small angle with reference to a neighbouring trace which angle may be 5 degrees maximum.

Figure 1B:
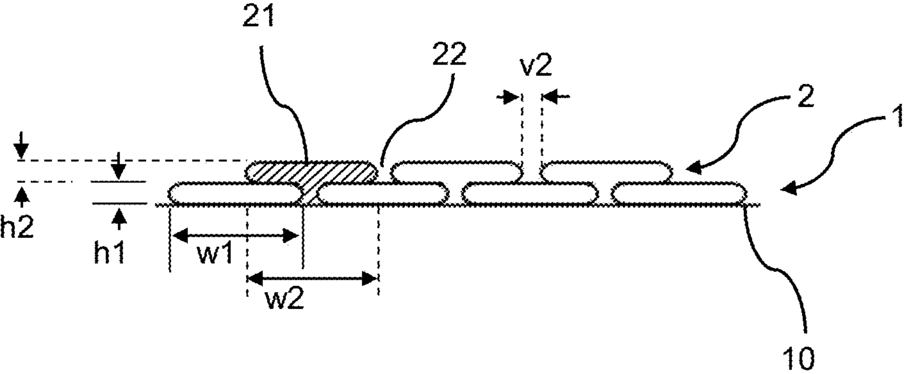

FIG. 1B schematically shows a cross-section of the first infill layer 1 with a second layer 2 printed on top of the first layer 1. The second layer 2 comprises a number of traces 21 that run substantially in parallel and are separated by voids 22. The traces 21 of the second layer 2 run parallel to the traces 11 of the first layer 1. The traces of the second layer 2 are designed to be deposited above the voids 12 in the first layer 1. In other words, the second layer 2 has an offset relative to the first layer 1. By using the suitable dimensions for the voids 12, and appropriate materials and depositing temperatures, it can be assured that the voids 12 are substantially filled when depositing the second layer 2. As a result, each of the traces 21 in the second layer 2, has a substantially T-shaped cross section, see the dashed trace in FIG. 1B.

Figure 1C:
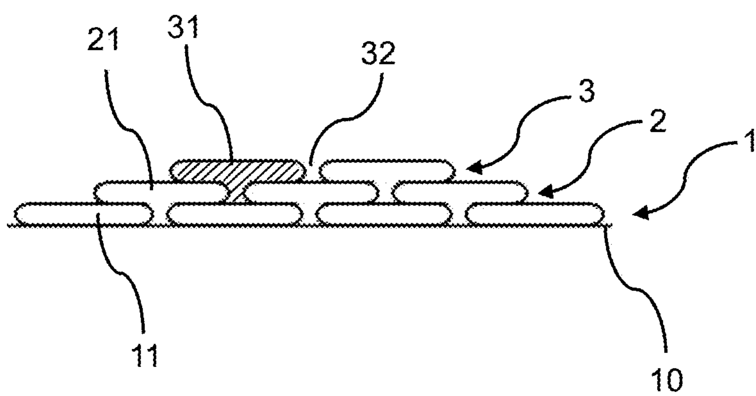

FIG. 1C schematically shows a cross-section of the first infill layer 1 and the second layer 2 with a third layer 3 printed on top of the second layer 2. The third layer 3 comprises a number of traces 31 that run in parallel and are separated by voids 32. The traces 31 of the third layer 2 run parallel to the traces 21 of the second layer 2. The traces of the third layer 3 are designed to be deposited above the voids 22 in the second layer 2. In other words, the third layer 3 has an offset relative to the second layer 2. As a result, each of the traces 31 in the third layer 3, has a substantially T-shaped cross section, see the dashed trace in FIG. 1C.

In the example of FIG. 1A-1C the traces in the different layers have approximately the same width and height, i.e. w1=w2 and h1=h2. In order to achieve the same dimensions in the second layer 2 as compared to the first layer 1, more printing material needs to be deposited when creating the traces of the second layer. This is due to the fact that also the voids 12 need to be filled. Depositing more material in the second layer 2 can be achieved by e.g. feeding more material through a nozzle per second and/or a slower movement of the nozzle relative to the print surface as compared to printing the first layer 1.

It is noted that the height and width of the traces in the different layers may vary per layer. Additionally, more than one material may be used for different layers (e.g. odd layers printed with material 1, and even layers with material 2, etc.). Furthermore, it is noted that not all layers need to be designed with voids in between the traces. This is explained with reference to FIGS. 2A-2C.

Figure 2A:
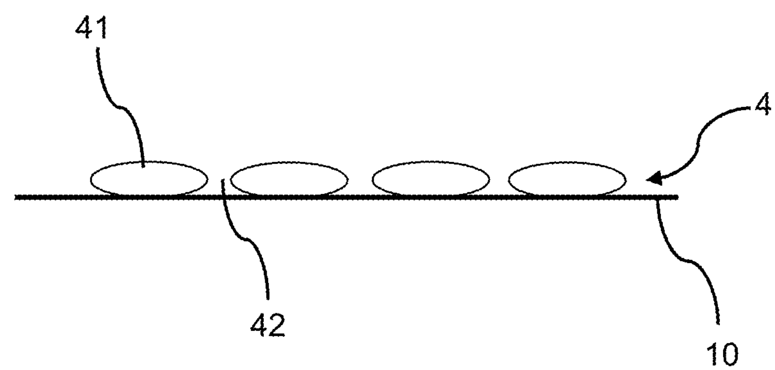
FIG. 2A shows a first layer comprises a number of traces that run in parallel and are separated by voids.
Figure 2B:
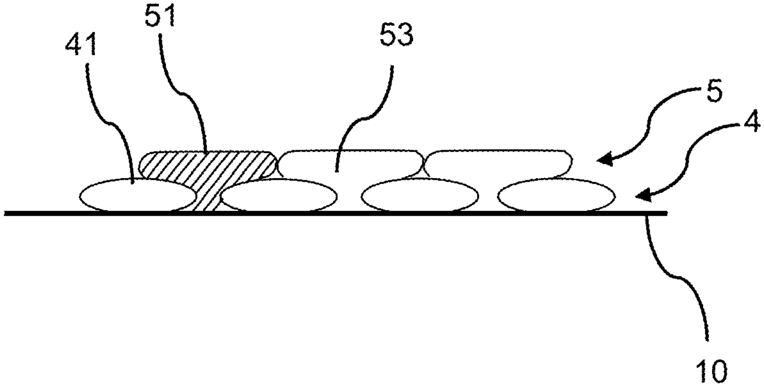
FIG. 2B schematically shows a cross-section of the first infill layer with a second layer printed on top of the first layer.

FIG. 2A shows a first layer 4 comprises a number of traces 41 that run in parallel and are separated by voids 42. It is noted that the printing direction in FIG. 2A is perpendicular to the plane of view. FIG. 2B schematically shows a cross-section of the first infill layer 4 with a second layer 5 printed on top of the first layer 4. The second layer 5 comprises a number of traces 51 that run in parallel and each touch a neighbouring trace. So no voids are created. The traces 51 of the second layer 5 run parallel to the traces 41 of the first layer 4. The traces of the second layer 5 are designed to be deposited above the voids 42 in the first layer 4. In other words, the second layer 5 has an offset relative to the first layer 4. During deposition, the voids 42 are substantially filled when depositing the second layer 5. As a result, each of the traces 51 in the second layer 5, has a substantially T-shaped cross section, see the dashed trace 51 in FIG. 2B.

Figure 2C:
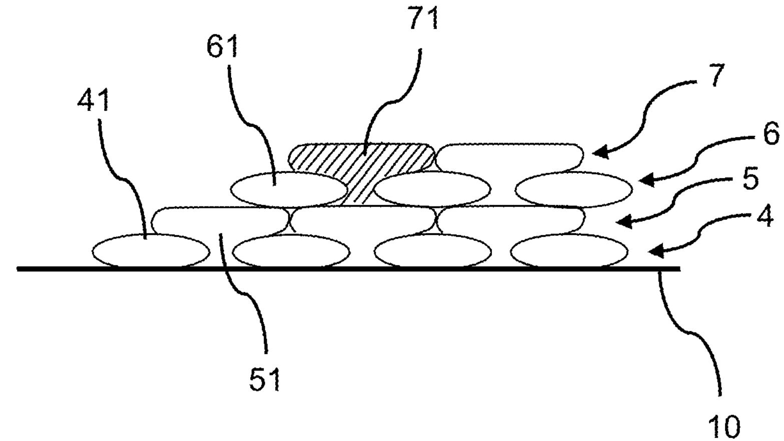
FIG. 2C schematically shows a cross-section of the first infill layer and the second layer with a third layer and a fourth layer printed on top.

FIG. 2C schematically shows a cross-section of the first infill layer 4 and the second layer 5 with a third layer 6 and a fourth layer 7 printed on top. The third layer 6 comprises a number of traces 61 that run in parallel and are separated by voids similar to those of the first layer, see voids 42. The third layer 3 has an offset relative to the second layer 2. In the example of FIG. 2C, the traces 61 of third layer 6 are positioned above the traces 41 of the first layer 4. The traces 71 of the fourth layer 7 run parallel to the traces 61 of the third layer 6. The traces 71 of the fourth layer 7 are designed to be deposited above the voids in the third layer 6 so as to substantially fill those voids. As a result, each of the traces 71 in the fourth layer 7, has a substantially T-shaped cross section, see the dashed trace 71 in FIG. 2C.

By creating the T-shaped traces as described above, an increase in Z-strength 3D printed parts can be achieved as compared to known layer structures. In an embodiment, objects are created having a 100% infill density wherein each two consecutive layers are 'interlocked' by the T-shaped extrusion lines.

In an exemplary embodiment, the Fused Filament Fabrication method comprises the following:

I. Printing the outer wall lines of the printed part using a known printing process.

II. Printing the infill lines, e.g. 0.35-0.50 mm wide and 0.2 mm high and parallel to each other at a specific distance (as were shown in FIG. 1A).

III. Printing a next layer parallel to the first layer, using a print volume sufficient to fill the gaps in the previous layer and forming extrusion line of a T-shape (see e.g. FIG. 1B).

IV. Printing each consecutive layer parallel to the first layer using the same extrusion lines as the ones used for the second layer, forming an array of interlocked T-shapes (see e.g. FIG. 1C).

At the very top layer of the infill, certain elongated gaps will be present by nature of this infill strategy. These gaps can be filled with top skin layers.

Figure 3:
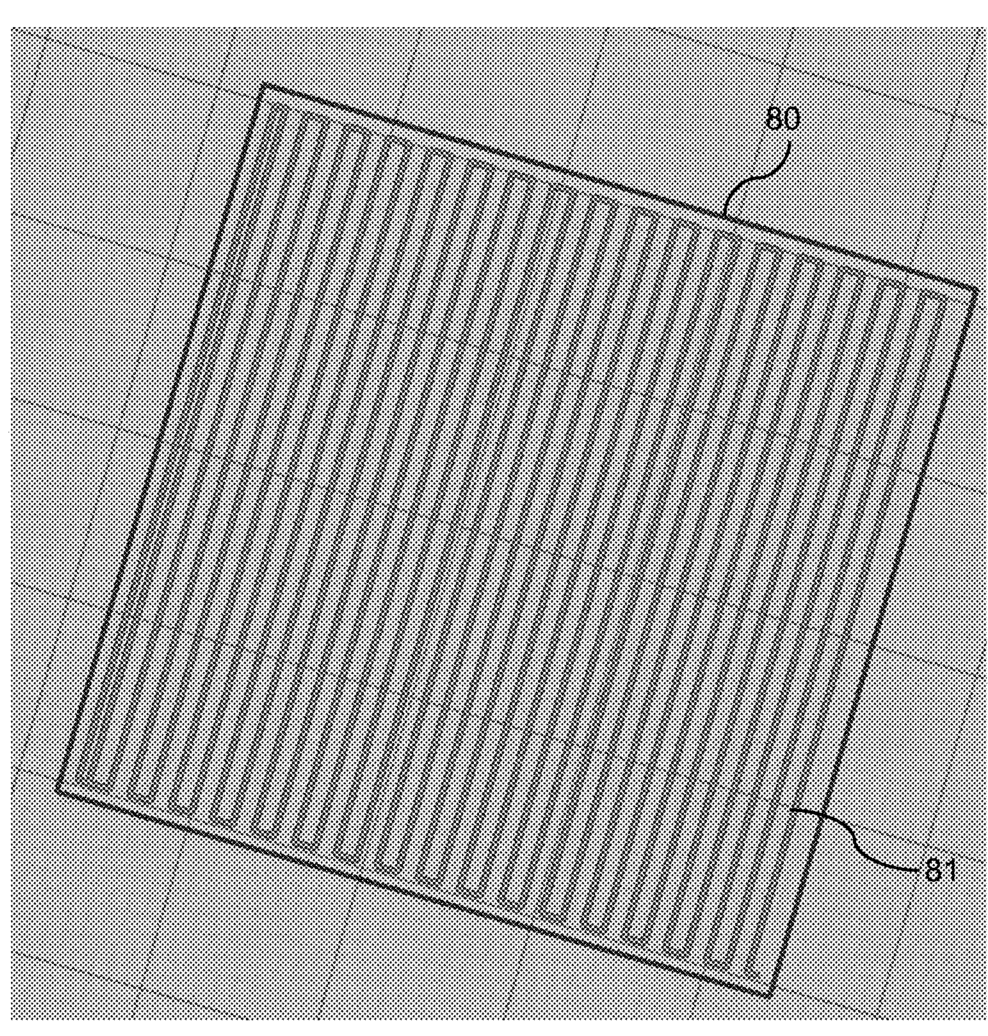
FIG. 3 shows a slicer program preview giving an example of a first layer comprising a number of parallel parts.
Figure 4:
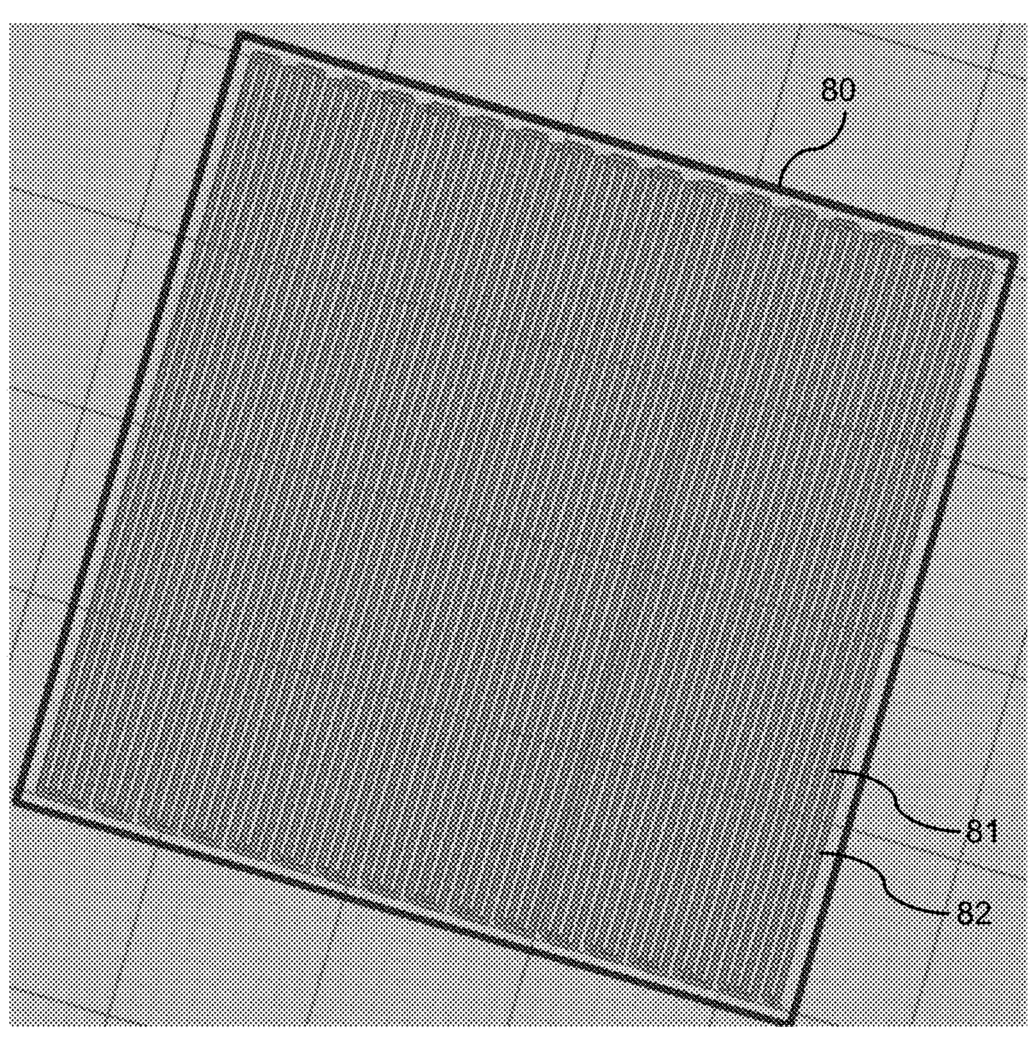
FIG. 4 shows a top view of the object of FIG. 3 but with an example of an additional second layer on top of the first layer and designed with an offset relative to the first layer.

FIG. 3 shows a slicer program preview giving an example of a first layer 81 comprising a number of parallel parts. FIG. 3 also shows an outer wall 80 of the object to be printed. FIG. 4 shows a top view of the object of FIG. 3 but with an example of an additional second layer 82 on top of the first layer 81 and designed with an offset relative to the first layer 81. The second layer 82 is printed using the same meandering print path (i.e. toolpath) as for the first layer 81.

To validate the above-described solutions, we performed a number of tests. In our tests the test parts were printed using an Ultimaker® S5. Test were performed using different materials and different offsets. In one test we used an x-offset=0.566 mm and an infill flow=100%. The parameter Infill line distance was set equal to the Line width in order to get 100% infill density. We also performed tests using two different colors, so that we could more easily see the produced infill arrangement at cross sections of the samples. For example, with extruder 1 we deposited ABS Red, and with extruder 2 we deposited ABS White. We also performed some tests using PLA. After printing the samples, we cut them to investigate the internal structure of the infill. Depending on the temperatures, flow rate and printing speeds used, we produced the structures as shown in FIG. 1C or structures as shown in FIG. 2C.

Figure 5:
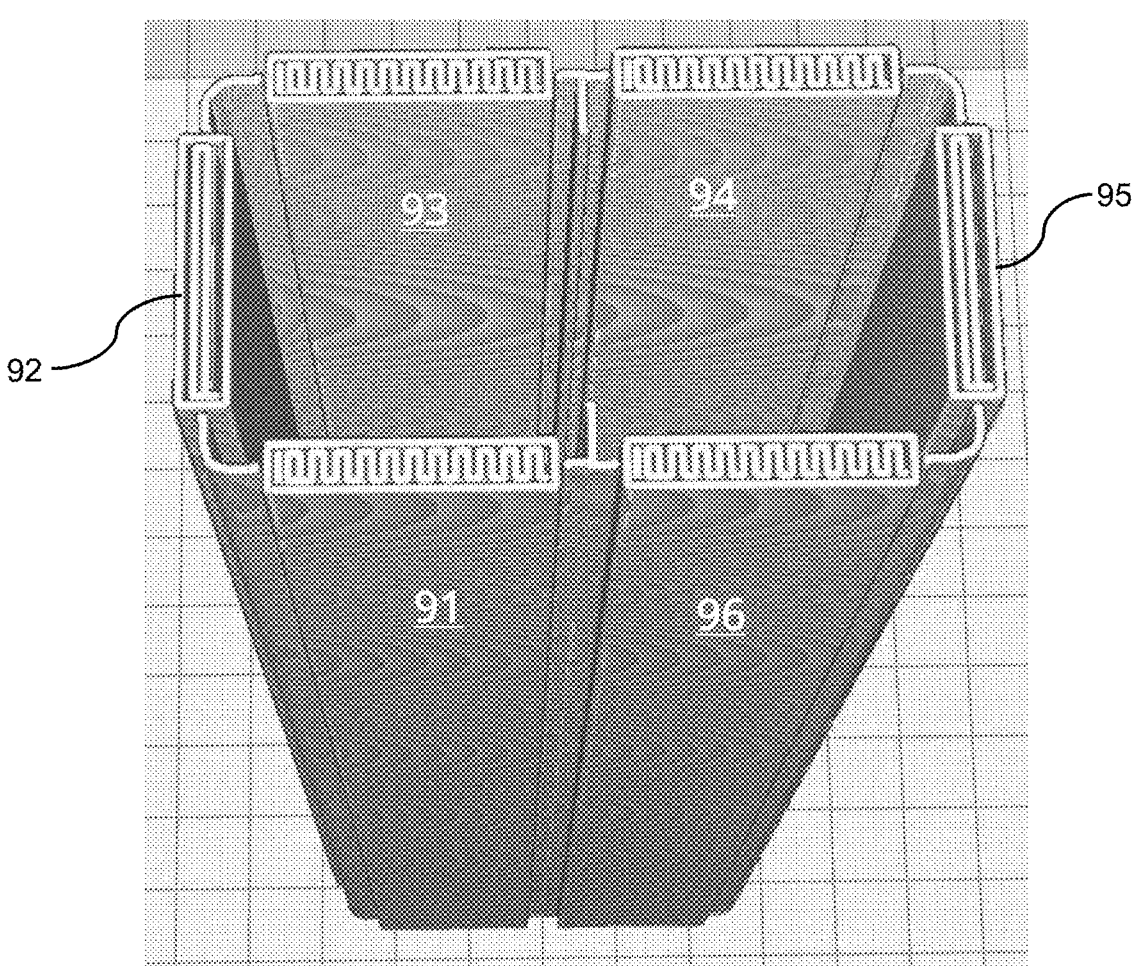
FIG. 5 is a picture of a slicing software program showing a perspective view of a number of bars used for our strength tests.

Since we were mainly interested in the Z-strength, we also printed several batches of tensile bars. FIG. 5 is a picture of a slicing software program showing a perspective view of a number of bars used for our strength tests. The bars are numbered 91, 92, 93, 94, 95 and 96. The bars were printed using ABS and with single extrusion. In the example of FIG. 5, the infill direction was 90°.

Figure 6:
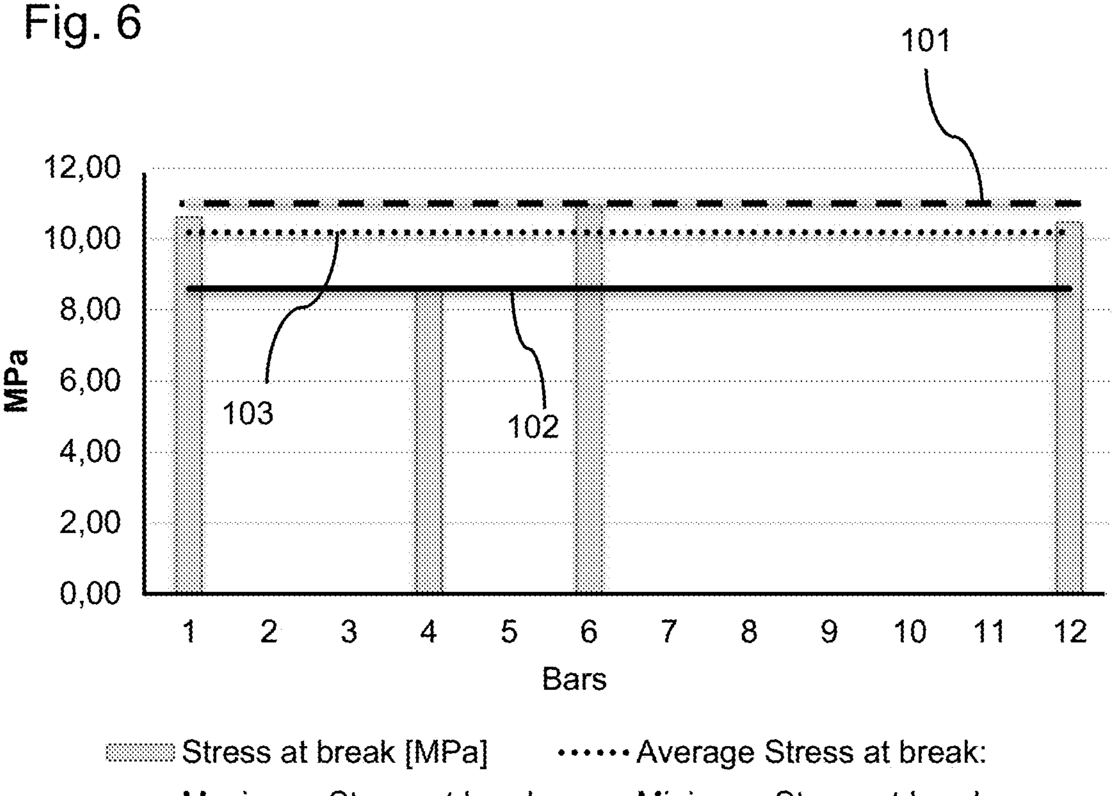
FIG. 6 shows a graph with test results of four bars with standard infill structures.

To be able to compare the proposed infill structure, we also printed bars with standard 100% infill. With standard 100% infill we mean printing parallel lines in every layer without voids in between. FIG. 6 shows a graph with test results of four bars with standard infill structures. The standard infill structures are made using parallel tracks without the designed voids in between the tracks. It is noted that we use the words ‘designed voids’ as it should be clear to the skilled reader that even in the 100% infill structure always some voids are presents as a result of the non-square cross sections of the printed traces when using FFF. These non-designed voids are usually the cause of a lower Z-strength.

In FIG. 6, the Y-axis shows the strength at break and the X-axis shows the bar number. As can be seen from FIG. 6 the stress at break varies for the different bars. The stress at break of the third bar (i.e. number 6) is the highest, see also line 101 indicating the maximum stress at break. The stress at break of the second bar (i.e. number 4) is the lowest, see also line 102 indicating the minimum stress at break. Line 103 indicates the average stress at break. In this test, the average stress at break was 10.19 MPa. The standard deviation SD=1.09 MPa, the average weight of the bars was 19.27 g with an SD=0.38 g.

Figure 7:
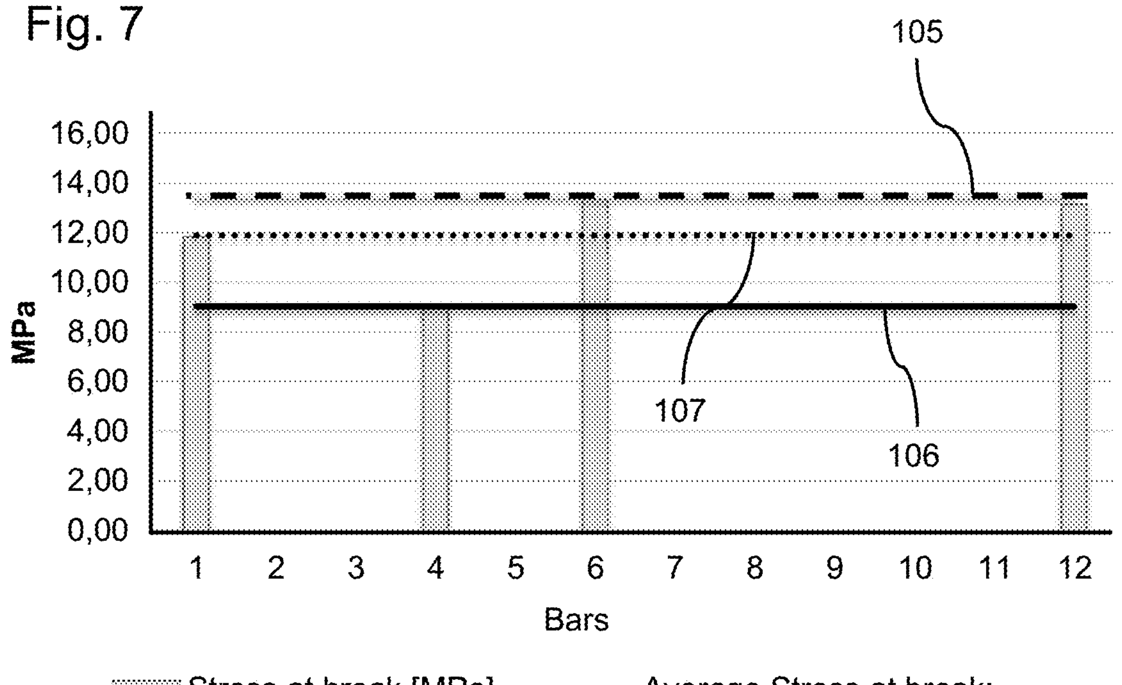
FIG. 7 shows a graph with test results of four bars with an infill structures designed according to the embodiment of FIG. 2A-2C.

FIG. 7 shows a graph with test results of four bars with an infill structures designed according to the embodiment of FIG. 2A-2C. In FIG. 7, the Y-axis shows the strength at break and the X-axis shows the bar number. As can be seen from FIG. 7 the stress at break varies for the different bars. The stress at break of the third bar (i.e. number 6) is the highest, see also line 105 indicating the maximum stress at break. The stress at break of the second bar (i.e. number 4) is the lowest, see also line 106 indicating the minimum stress at break. Line 107 indicates the average stress at break. In this test, the average stress at break was 11.88 MPa. The standard deviation SD=2.03 MPa, the average weight of the bars was 19.29 g with an SD=0.68 g.

If the results of FIGS. 6 and 7 are compared, we can conclude that on average the tensile bars with the new infill structure are stronger that the bars using the standard infill.

Figure 8:
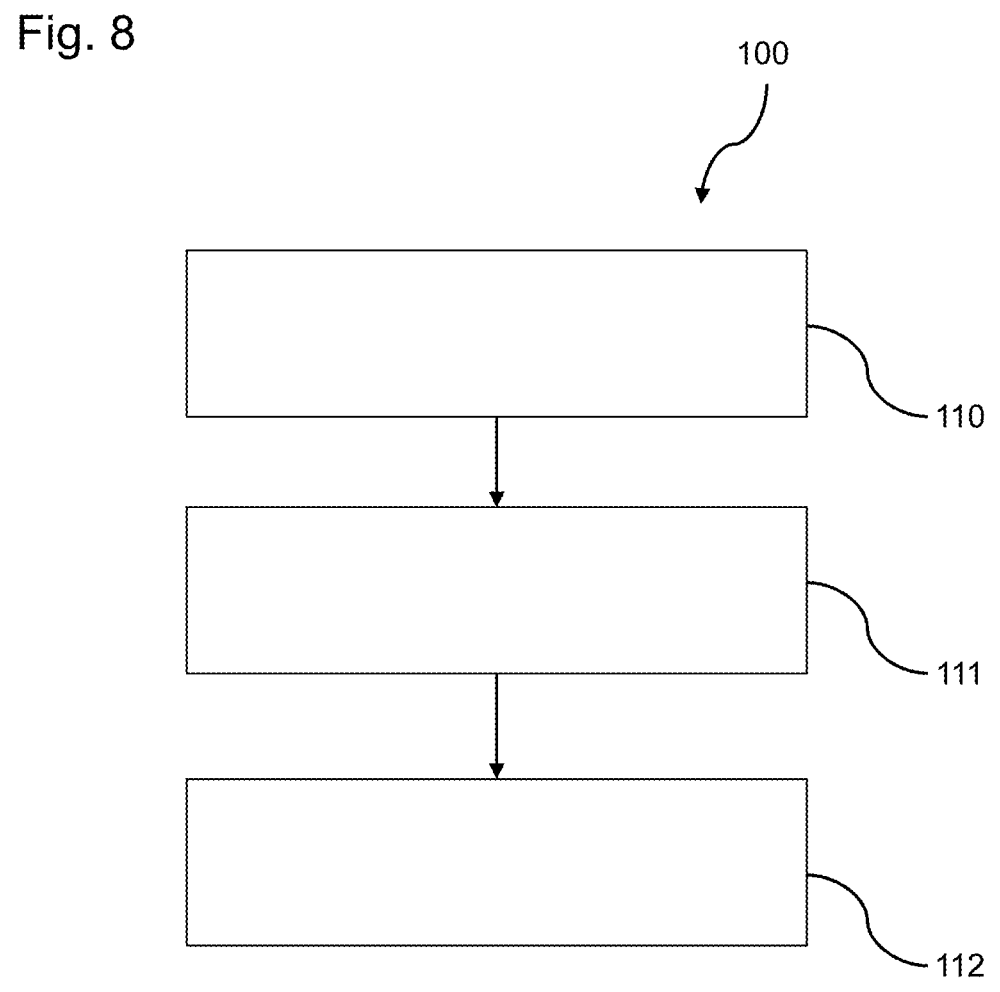

FIG. 8 shows a flow chart of a method 100 of creating instructions for an FFF printer for printing an infill structure of a 3D object, according to an embodiment of the invention. The method 100 comprises creating first instructions 110 for printing a first layer comprising a number of substantially parallel traces that are separated by intermediate elongated first voids with a first predefined width. The method also comprises creating second instructions 111 for printing a second layer with traces running substantially in parallel to the traces of the first layer, but with a first offset to the traces of the first layer, such that the traces of the second layer are arranged above the elongated first voids in the first layer. The method also comprises creating third instructions 112 for printing a third layer with traces running substantially in parallel to the traces of the second layer, but with a second offset to the traces of the second layer, wherein the traces in the third layer are separated by intermediate elongated third voids.

Figure 9:
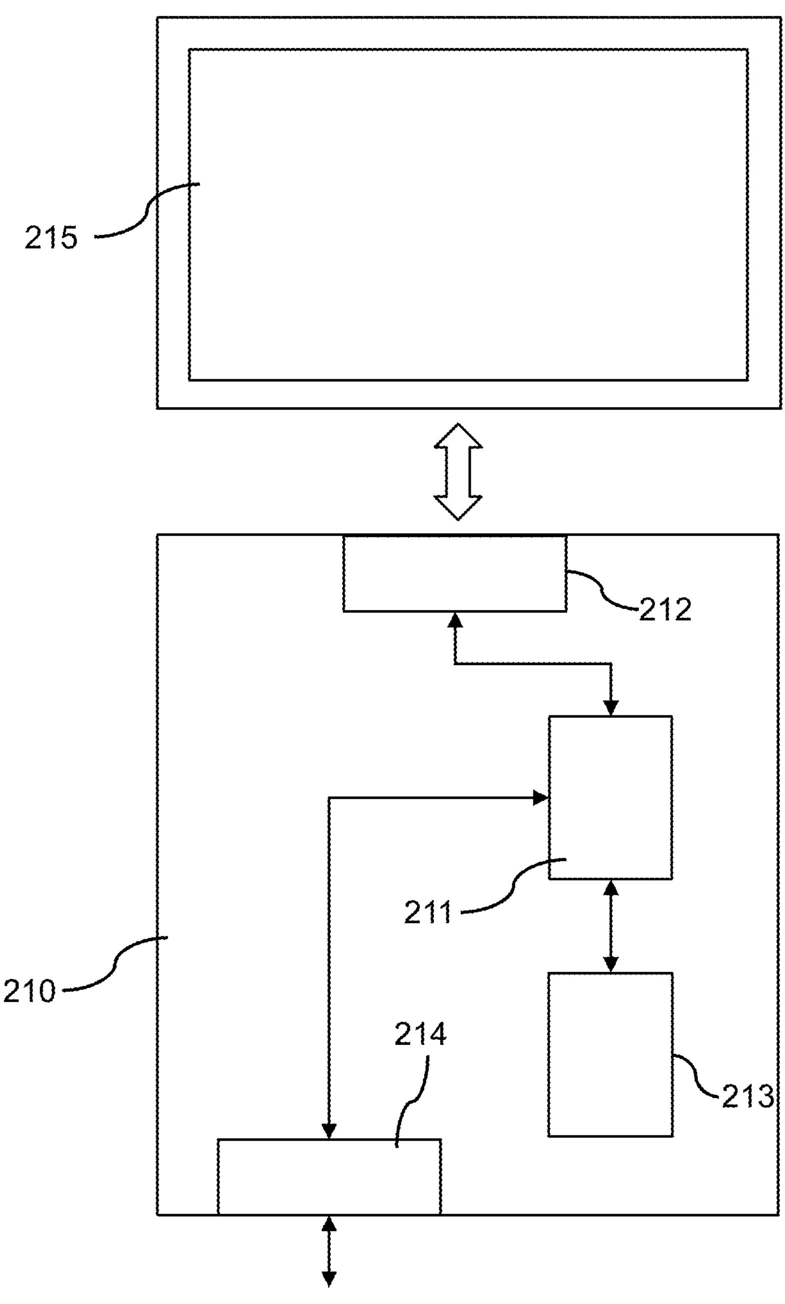
FIG. 9 schematically shows a computing device according to an embodiment.

FIG. 9 schematically shows a computing device 210 according to an embodiment. The device 210 comprises a processing unit 211, an I/O interface 212 and a memory 213. The processing unit 211 is arranged to read and write data and computer instructions from the memory 213. The processing unit 211 is also arranged to communicate with sensors and other equipment via the I/O interface 212. The device 210 may also comprise an interface 214 arranged to communicate with other devices via a LAN or WAN (not shown). FIG. 9 also shows a display 215 which may be connected to the interface 212 so as to show information regarding a slicing process of a 3D object. The memory 213 may comprise a volatile memory such as RAM, or a non-volatile memory such as a ROM memory, or any other type of computer-readable storage. The memory 213 may comprise a computer program product comprising code configured to make the processing unit 211 perform one or more of the embodiments of the method of creating instructions for an FFF printer as described above.

Figure 10:
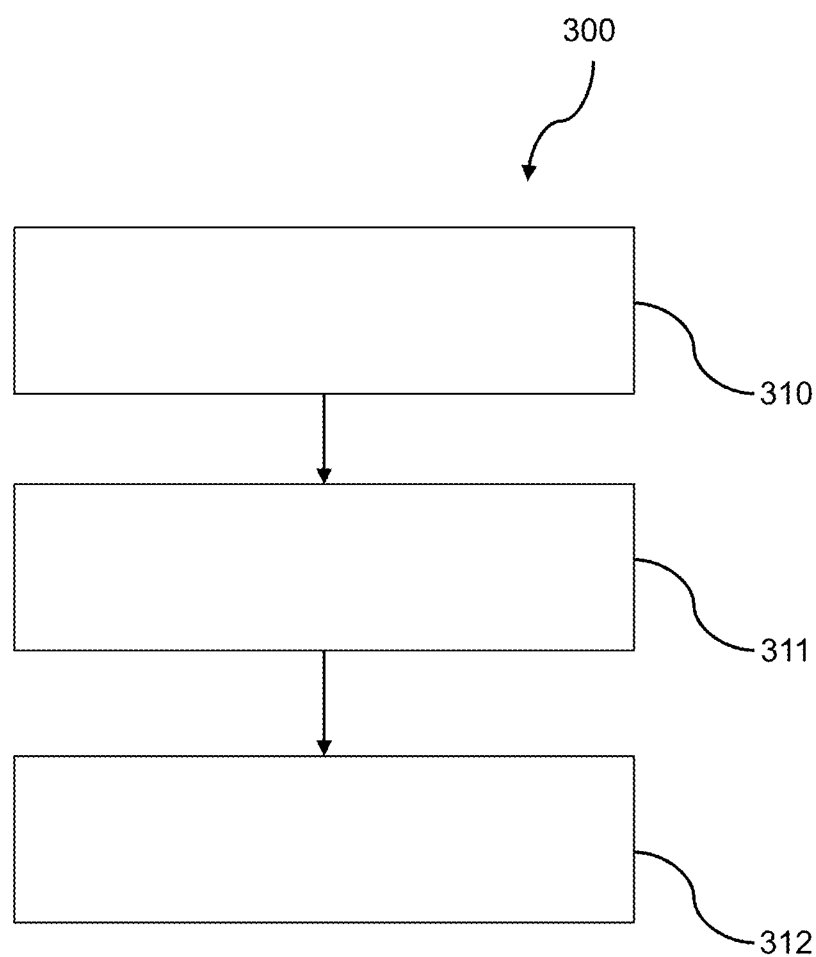
FIG. 10 shows a flow chart of a Fused Filament Fabrication method according to an embodiment of the invention, and FIG. 11 schematically shows an example of an FFF device.

FIG. 10 shows a flow chart of a Fused Filament Fabrication method 300 according to an embodiment of the invention. The FFF method comprises depositing 310 a first layer comprising a number of substantially parallel traces that are separated by intermediate elongated first voids with a first predefined width. The method 300 also comprises depositing 311 a second layer with traces running substantially in parallel to the traces of the first layer, but with a first offset to the traces of the first layer, such that the traces of the second layer are arranged above the elongated first voids in the first layer. The method also comprises depositing 312 a third layer with traces running substantially in parallel to the traces of the second layer, but with a second offset to the traces of the second layer, wherein the traces in the third layer are separated by intermediate elongated third voids.

Figure 11:
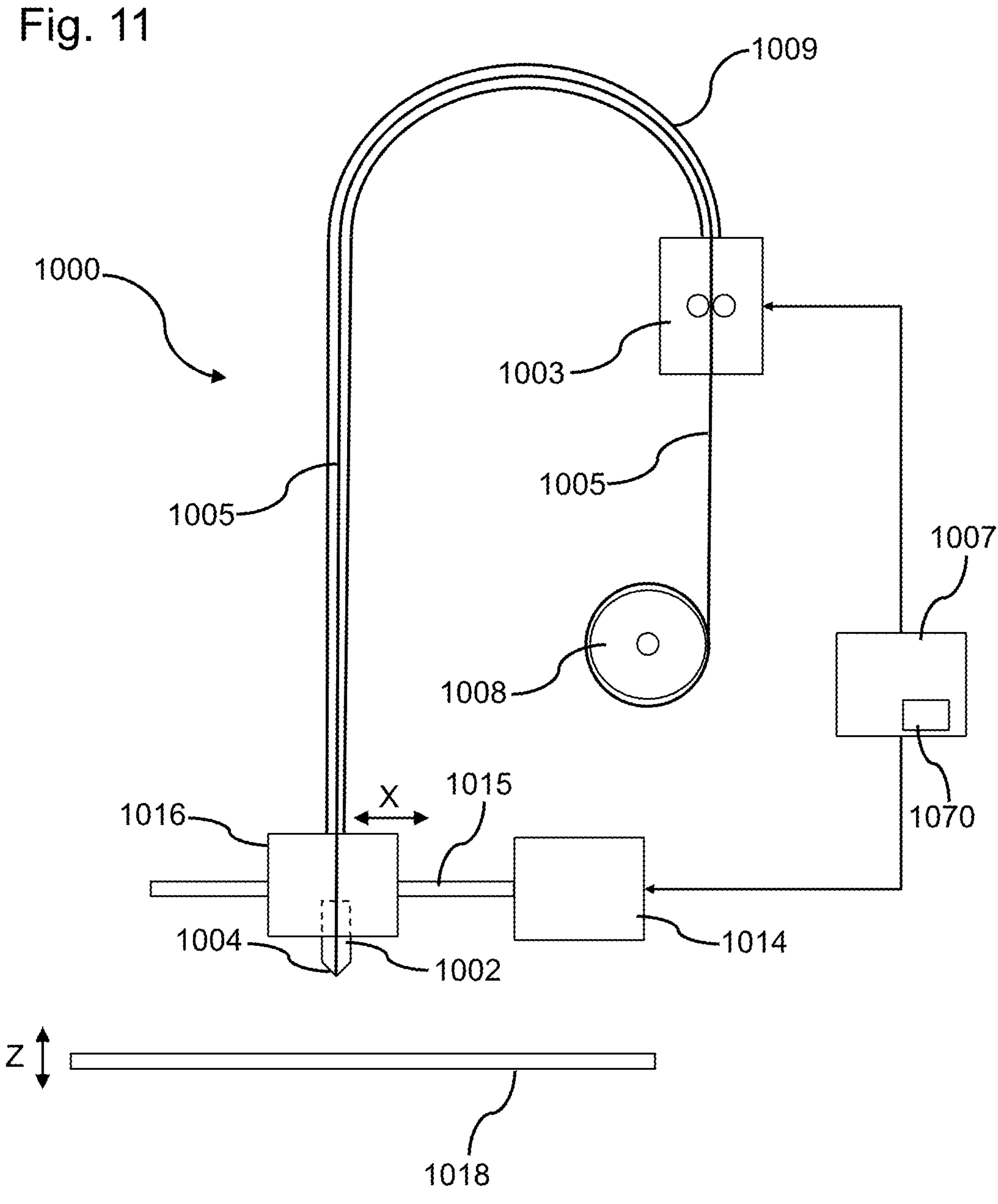

FIG. 11 schematically shows an example of an FFF device 1000, also referred to as the 3D printer 1000. The 3D printer 1000 comprises a print head 1002 also referred to a deposition head 1002. At its outer end the print head 1002 comprises a nozzle 1004 where molten filament can leave the deposition head 1002. A filament 1005 is fed into the print head 1002 by means of a feeder 1003. Part of the filament 1005 is stored in a filament storage which could be a spool 1008 rotatably arranged onto a housing (not shown) of the 3D printer, or rotatably arranged within a container (not shown) containing one or more spools. The 3D printer 1000 comprises a controller 1007 arranged to control the feeder 1003 and the movement of the print head 1002, and thus of the nozzle 1004. The controller 1007 may comprise one or more processing units 1070. By executing suitable instructions on the processing units 1070, the FFF device 1000 may be arranged to perform the method as described in FIG. 10. The instructions may comprise G-code produced by the computing device 210 shown in FIG. 9.

In this embodiment, the 3D printer further comprises a Bowden tube 1009 arranged to guide the filament 1005 from the feeder 1003 to the print head 1002. The 3D printer 1000 also comprises a gantry arranged to move the print head 1002 at least in one direction, indicated as the X-direction. In this embodiment, the print head 1002 is also movable in a Y-direction perpendicular to the X-direction. The gantry comprises at least one mechanical driver 1014 and one or more axles 1015 and a print head docking unit 1016. The print head docking unit 1016 holds the print head 1002 and for that reason is also called the print head mount 1016. It is noted that the print head docking unit 1016 may be arranged to hold more than one print head, such as for example two print heads each receiving its own filament. The feeder 1003 is arranged to feed and retract the filament 1005 to and from the print head 1002. The feeder 1003 may be arranged to feed and retract filament at different speeds to be determined by the controller 1007.

A build plate 1018 may be arranged in or under the 3D printer 1000 depending on the type of 3D printer. The build plate 1018 may comprise a glass plate or any other object suitable as a substrate. In the example of FIG. 11, the build plate 1018 is movably arranged relative to the print head 1002 in a Z-direction, see FIG. 11. It is noted that instead of a build plate, other build surfaces may be used such as surfaces of movable belts.

It is noted that in the FIGS. 1B and 2B, the T-shaped cross sections of the extrusion lines 21, 51 are symmetrical. It is fully within the scope of this invention that asymmetrical T-shapes including edge case of T-Shape asymmetrically collapsing into the upside-down L-Shape are alternative solutions. It is further noted that in alternative embodiments, when creating the infill of an object, after printing n-layers (e.g. 3<n<100) the top layer (i.e. $n^{th}$ layer) can be finished using a standard infill strategy, after which the orientation in the X-Y plane of the infill lines can be changed by an offset (e.g. 45° or 90°). In this way, the extrusion lines of the object are not all aligned in any particular direction, so the mechanical properties in other directions are increased.

The present invention has been described above with reference to a number of exemplary embodiments as shown in the drawings. Modifications and alternative implementations of some parts or elements are possible and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A method of creating instructions for a fused filament fabrication printer for printing an infill structure of a 3D object, the method comprising:

- creating first instructions for printing a first layer comprising a number of substantially parallel traces that are separated by intermediate elongated first voids with a first predefined width;
- creating second instructions for printing a second layer with traces running substantially in parallel to the traces of the first layer, but with a first offset to the traces of the first layer, such that the traces of the second layer are arranged above the elongated first voids in the first layer, and each trace in the second layer is dimensioned to contact at least one other trace of the second layer;
- creating third instructions for printing a third layer with traces running substantially in parallel to the traces of the second layer, but with a second offset to the traces of the second layer, wherein the traces in the third layer are separated by intermediate elongated third voids.

2. The method according to claim 1, wherein the first predefined width of the first voids is dimensioned so that when depositing the second layer, a first amount of the print material of the second layer enters the first voids in the first layer, and a second amount of the print material of the second layer lies on top of the first layer.

3. The method according to claim 2, wherein the first predefined width of the first voids is dimensioned so that it is greater than 0.1*a predefined width of the traces in the first layer and less than or equal to the predefined width of the traces in the first layer.

4. The method according to claim 1, wherein the traces of the second layer are created using more material per area unit as compared to the traces of the first layer.

5. The method according to claim 1, wherein the traces of the second layer, after deposition, are in contact with a layer below the first layer.

6. The method according to claim 1, wherein the first and second offset are selected so that the traces of the third layer are arranged above the traces of the first layer.

7. A computing device comprising one or more processing units, the one or more processing units being arranged to perform the method according to claim 1.

8. A Fused Filament Fabrication method comprising:

- depositing a first layer comprising a number of substantially parallel traces that are separated by intermediate elongated first voids with a first predefined width;
- depositing a second layer with traces running substantially in parallel to the traces of the first layer, but with a first offset to the traces of the first layer, such that the traces of the second layer are arranged above the elongated first voids in the first layer, and each trace in the second layer is dimensioned to contact at least one other trace of the second layer;
- depositing a third layer with traces running substantially in parallel to the traces of the second layer, but with a second offset to the traces of the second layer, wherein the traces in the third layer are separated by intermediate elongated third voids.

9. The Fused Filament Fabrication method according to claim 8, wherein the first and third layer are deposited using a first material, and the second layer is deposited using a second material different from the first material.

10. The Fused Filament Fabrication method according to claim 8, wherein the first predefined width of the first voids is dimensioned so that when depositing the second layer, a first amount of the print material of the second layer enters the first voids in the first layer, and a second amount of the print material of the second layer lies on top of the first layer.

11. The Fused Filament Fabrication method according to claim 8, wherein the traces of the second layer comprise more material per area unit as compared to the traces of the first layer.

12. The Fused Filament Fabrication method according to claim 8, wherein the traces of the second layer contact a layer below the first layer.

13. The Fused Filament Fabrication method according to claim 8, wherein the traces of the third layer are arranged above the traces of the first layer.

14. A computer program product comprising code embodied on a non-transitory computer-readable storage medium and configured so as when run on one or more processing units to perform the method according to claim 1.

* * * * *